United States Patent [19]

Shutou et al.

[11] Patent Number: 5,517,066
[45] Date of Patent: May 14, 1996

[54] CONSTANT VOLTAGE DRIVE TYPE DRIVER CIRCUIT

[75] Inventors: Hideki Shutou, Chikushi; Osamu Kobayashi, Yokohama; Koji Ikeda, Kawasaki, all of Japan

[73] Assignee: Fujitsu Limited, Kanagawa, Japan

[21] Appl. No.: 191,582

[22] Filed: Feb. 3, 1994

Related U.S. Application Data

[63] Continuation of Ser. No. 616,075, Nov. 20, 1990, abandoned.

[30] Foreign Application Priority Data

Nov. 20, 1989 [JP] Japan ................. 1-301665

[51] Int. Cl.⁶ ............................................. H03K 17/16
[52] U.S. Cl. ................................. 307/43; 379/415
[58] Field of Search .................... 323/253–263; 307/43–56; 327/310, 309, 328, 327; 379/414, 415, 416

[56] References Cited

U.S. PATENT DOCUMENTS

| | | | |
|---|---|---|---|
| 4,121,118 | 10/1978 | Miyazaki | 307/262 |
| 4,440,979 | 4/1984 | McGibbon et al. | 179/16 |
| 4,517,633 | 5/1985 | Melcher | 363/21 |
| 4,615,039 | 9/1986 | Li et al. | 375/36 |

FOREIGN PATENT DOCUMENTS

| | | |
|---|---|---|
| 0247675 | 12/1987 | European Pat. Off. . |
| 0272171 | 6/1988 | European Pat. Off. . |
| 0326968 | 8/1989 | European Pat. Off. . |

OTHER PUBLICATIONS

Patent Abstracts of Japan, vol. 8, No. 53 (E–231) (1490) & JP-A-58 205 357 (Nippon Denki K.K.) *abstract*.

Patent Abstracts of Japan, vol. 10, No. 50 (E–384) & JP-A-60 203 043 (Nippon Denshin Denwa Kosha) *abstract*.

*Primary Examiner*—Peter S. Wong
*Assistant Examiner*—Aditya Krishnan
*Attorney, Agent, or Firm*—Staas & Halsey

[57] ABSTRACT

A constant voltage drive type driver circuit includes a pulse transformer for outputting output pulses having a predetermined peak value and having primary and primary windings. The secondary winding has first and second terminals and an equivalent load impedance is connected to the secondary winding when viewed from the pulse transformer excluding an impedance of the secondary winding itself. A power source supplies a voltage, and a switching circuit supplies the voltage from the power source to the primary winding of the pulse transformer in a first mode and cuts off the supply of the voltage to the primary winding in a second mode in response to control signals. A short-circuiting part short-circuits the first and second terminals of the primary winding of the pulse transformer for a predetermined time from a time when the switching circuit assumes the second mode.

20 Claims, 11 Drawing Sheets

CONSTANT VOLTAGE DRIVE TYPE DRIVER CIRCUIT

This application is a continuation of application No. 07/616,075, filed Nov. 20, 1990, now abandoned.

BACKGROUND OF THE INVENTION

The present invention generally relates to driver circuits, and more particularly to a constant voltage drive type driver circuit which outputs pulses having a regular peak value to a load impedance on a winding of a pulse transformer.

The integrated services digital network (ISDN) is a digital network capable of integrally handling various services such as telephone, facsimile communication, data communication and image communication. The reference points of the multi-purpose user/network interface of the ISDN are defined as shown in FIG.1 in the CCITT Recommendations of the Series I.

Figure 1:
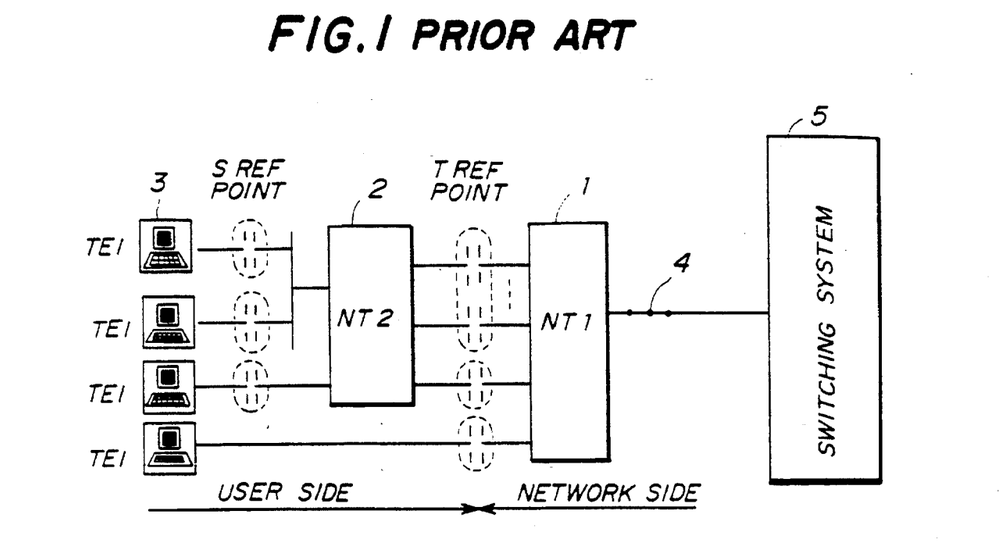
FIG. 1 is a system block diagram for explaining a conventional user/network interface of an ISDN.

In FIG. 1, line terminating equipment (NT1) 1 terminates a digital subscriber line 4 from a switching system 5. The NT1 synchronizes the line, supplies power and also has other electrical connecting functions. Terminal equipment (NT2) 2 has a line connection control function. Standard terminal equipment (TE1) 3 has terminal functions in conformance with the CCITT Recommendations of the Series I Interface. T and S reference points are defined as shown in FIG. 1. The T reference point is a point between the user side and the network side, and the S reference point is a point between the NT2 2 and the TE1 3. Although not shown, an R reference point is set between a terminal adapter and existing terminal equipment.

A constant voltage drive type driver circuit (e.g., FIG. 2) is provided at the S and T reference points (see FIG. 1) of the ISDN. In other words, the constant voltage drive type driver circuit is provided at the output end of the NT1 1 on the side of the NT2 2, at the output ends of the NT2 2 on the sides of the NT1 1 a and the TE1 3, and at the output end of the TE1 3 on the side of the NT2 2.

The constant voltage drive type driver circuit must be designed so that the waveform of output pulses thereof is within a regular tolerable range.

Figure 2:
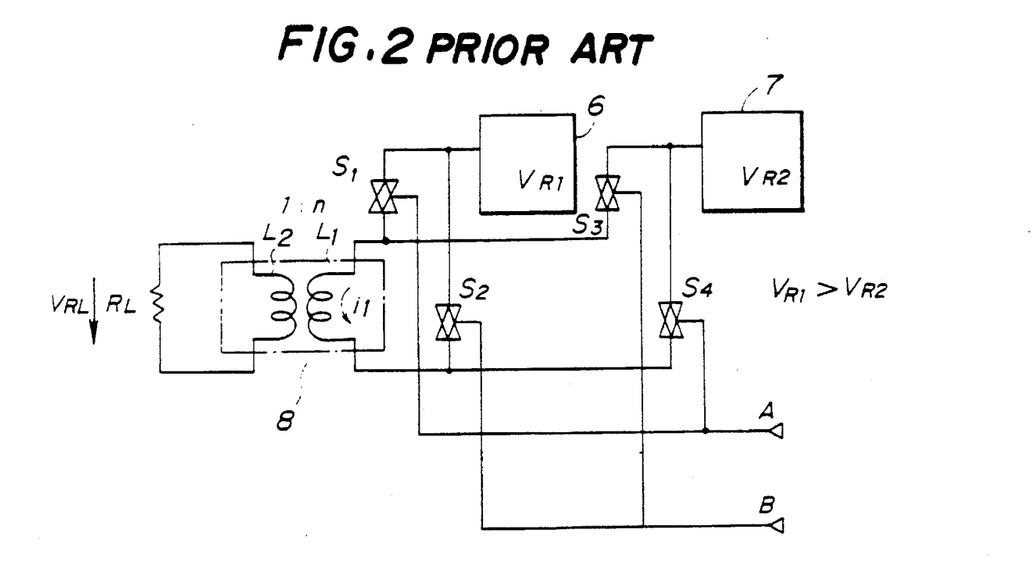
FIG. 2 is a circuit diagram of an example of a convent al driver circuit.

FIG. 2 shows an example of a conventional driver circuit. In FIG. 2, a first reference voltage source 6 generates a first reference voltage $V_{R1}$, and a second reference voltage source 7 generates a second reference voltage $V_{R2}$, where $V_{R1} > V_{R2}$. The switching of analog switches S1 and S4 is controlled by a first control signal A, and the switching of analog switches S2 and S3 is controlled by a second control signal B.

A pulse transformer 8 has a primary winding L1 and a secondary winding L2, where the turn ratio of the windings L1 and L2 is set to n:1. An equivalent load impedance $R_L$ which exists when the line side is viewed from the pulse transformer 8, is connected to the secondary winding L2. In other words, the load impedance $R_L$ is connected across terminals of the secondary winding L2 when the impedance of the secondary winding L2 is neglected. One end of the primary winding L1 is coupled to the reference voltage source 6 via the analog switch S1 on one hand, and is coupled to the reference voltage source 7 via the analog switch S3 on the other. In addition, the other end of the primary winding L1 is coupled to the reference voltage source 6 via the analog switch S2 on one hand, and is coupled to the reference voltage source 7 via the analog switch S4 on the other.

2

Next, a description will be given of the operation of the driver circuit shown in FIG. 2. The first control signal A is a digital control signal for transmitting an upward pulse to the line, and the second control signal B is a digital control signal for transmitting a downward pulse to the line. The first and second control signals A and B will not assume a high level at the same time, but may assume a low level at the same time.

Figures 3A, 3B, 3C, 3D, 3E:
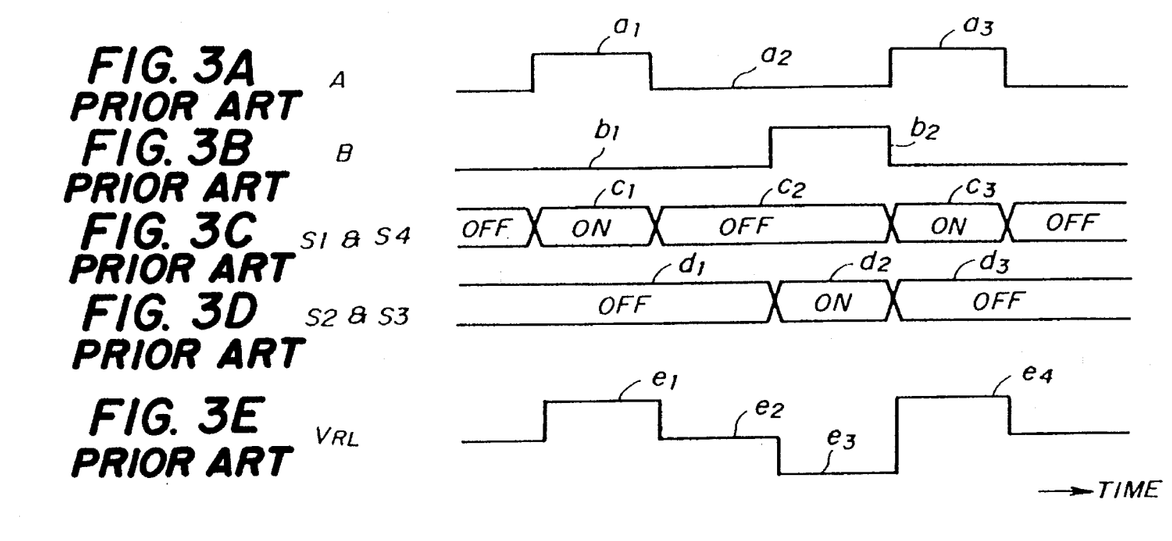
FIG. 3 is a timing chart for explaining an operation of the conventional driver circuit shown in FIG. 2.

First, when the first control signal A assumes a high level as indicated by a1 in FIG. 3(A), the analog switches S1 and S4 turn ON as indicated by c1 in FIG. 3(C). In this state, the second control signal B assumes a low level as indicated by b1 in FIG. 3(B). Hence, the analog switches S2 and S3 are OFF as indicated by d1 in FIG. 3(D). Accordingly, the reference voltage $V_{R1}$ is applied to one end of the primary winding L1 of the pulse transformer 8 via the analog switch S1, and the reference voltage $V_{R2}$ is applied to the other end of the primary winding L1 via the analog switch S2. A current i1 flows through the primary winding L2 in a direction indicated by an arrow in FIG. 2.

Pulses having a peak value $V_{RL}$ described by the following formula (1) are output to the load impedance $R_L$ connected to the secondary winding L2 of the pulse transformer 8. Since $V_{R1} > V_{R2}$, the peak value $V_{RL}$ of the output pulses is a positive (upward) pulse as indicated by e1 in FIG. 3(E).

$$V_{RL} = (V_{R1} - V_{R2})/n \tag{1}$$

Next, when the first control signal A assumes a low level as indicated by a2 in FIG. 3(A), the analog switches S1 and S4 turn OFF as indicated by c2 in FIG. 3(C). As a result, a voltage is no longer applied to the primary winding L1 of the pulse transformer 8, and the peak value $V_{RL}$ of the output pulses becomes zero as indicated by e2 in FIG. 3(E).

When the second control signal B assumes a high level as indicated by b2 in FIG. 3(B), the analog switches S2 and S3 turn ON as indicated by d2 in FIG. 3(D). Hence, a current flows through the primary winding L2 in a direction opposite to the direction of the arrow shown in FIG. 2, and the pulses having a negative peak value $V_{RL}$ described by the formula (1) is obtained at the secondary winding L2. As a result, a negative (downward) pulse is applied to the load impedance $R_L$ as indicated by e3 in FIG. 3(E). That is, the peak value $V_{RL}$ of the output pulses is a negative (downward) pulse.

Next, when the first control signal A assumes the high level as indicated by a3 in FIG. 3(A), the second control signal B assumes the low level. Thus, similarly as described above, the analog switches S1 and S4 turn ON as indicated by c3 in FIG. 3(C) and the analog switches S2 and S3 turn OFF as indicated by d3 in FIG. 3(D). Accordingly, the peak value $V_{RL}$ of the output pulses is a predetermined positive (upward) pulse as indicated by e4 in FIG. 3(E).

Therefore, the data to be transmitted are output from the pulse transformer 8 to the load impedance $R_L$ as output pulses having the peak value $V_{RL}$, that is, in the form of a bipolar code, depending on the first and second control signals A and B.

Figure 4:
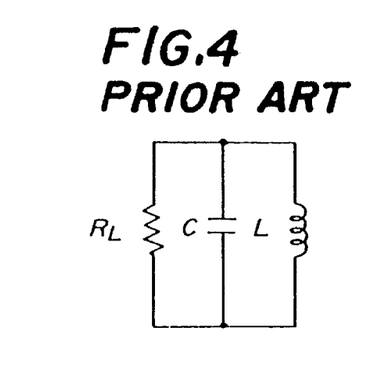
FIG. 4 is a circuit diagram of a parallel circuit corresponding to the conventional driver circuit shown in FIG. 2.

However, according to the conventional driver circuit shown in FIG. 2, the analog switches S1 through S4 may turn OFF at the same time. In this case, the terminal at the primary winding L1 of the pulse transformer 8 assumes a high impedance state. For this reason, when the driver circuit on the side of the load impedance $R_L$ is viewed from the side of the primary winding L1 of the pulse transformer 8, the equivalent circuit becomes as shown in FIG.4. The equivalent circuit shown in FIG.4 is a parallel circuit including a leakage inductance L of the pulse transformer 8, a line capacitance C and an impedance $R_L$ of the load impedance $R_L$.

Accordingly, immediately after the analog switches S1 and S4 (or S2 and S3) undergo a transition from the ON state to the OFF state in a state where the analog switches S2 and S3 (or S1 and S4) are OFF, the parallel circuit shown in FIG. 4 functions as a damped oscillation circuit and discharges the charge which is stored in the line capacitance C when the impedance of the load impedance $R_L$ is small. In this state, an undershoot is generated at the falling edge of the output pulse as indicated by a solid line in FIG. 5.

Figure 5:
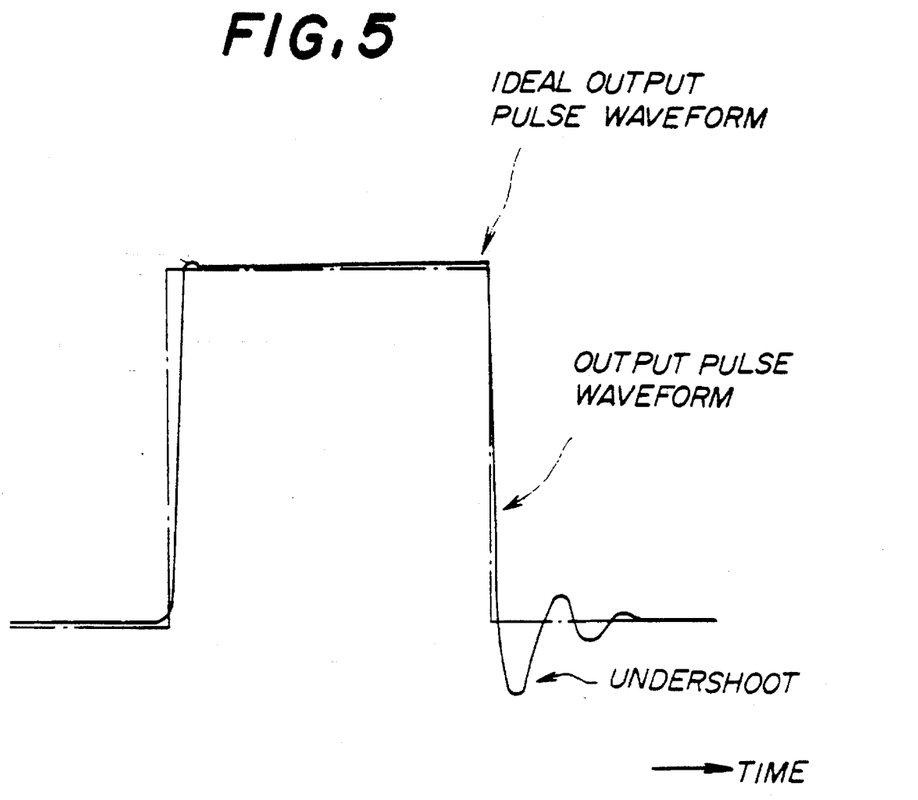
FIG. 5 shows an output pulse waveform which is obtained by the conventional driver circuit shown in FIG. 2.

In FIG. 5, the solid line indicates the output pulse obtained in the conventional driver circuit, and a one-dot chain line indicates ideal output pulse. The rising edge of the output pulse obtained by the conventional driver circuit is approximately the same as that of the ideal waveform. However, since the undershoot occurs at the falling edge for the reason described above, there is a problem in that a noise is generated thereby. Particularly, there is a problem in that the pulse mask prescribed under Section 8.5.3 of the CCITT Recommendations of the Series I.430 cannot be satisfied at the S and T reference points of the ISDN.

SUMMARY OF THE INVENTION

Accordingly, it is a general object of the present invention to provide a novel and useful driver circuit in which the problems described above are eliminated.

Another and more specific object of the present invention is to provide a constant voltage drive type driver circuit comprising a pulse transformer for outputting output pulses having a predetermined peak value and having primary and secondary windings, where the primary winding has first and second terminals and an equivalent load impedance is connected to the secondary winding when viewed from the pulse transformer excluding an impedance of the secondary winding itself, power source means for supplying a voltage, switching circuit means coupled to the power source means for supplying the voltage from the power source means to the primary winding of the pulse transformer in a first mode and for cutting off the supply of the voltage to the primary winding in a second mode in response to control signals, and short-circuiting means coupled between the switching circuit means and the primary winding of the pulse transformer for short-circuiting the first and second terminals of the primary winding of the pulse transformer for a predetermined time from a time when the switching circuit means assumes the second mode. According to the driver circuit of the present invention, it is possible to suppress the undershoot of the output pulses of the pulse transformer, and thus reduce the effects of noise which is caused by the undershoot. When the driver circuit is used in an interface at the S or T reference point in conformance with the CCITT Recommendations of the Series I Interface, it is possible to sufficiently satisfy the pulse mask prescribed by the CCITT Recommendations. Furthermore, since it is possible to reduce the noise caused by the undershoot without the need to provide a noise reduction capacitor on the primary side of the pulse transformer, it is unnecessary to connect an external element when the driver circuit is produced in the form of a large scale integrated circuit (LSI). The entire driver circuit can be provided within a single inexpensive LSI chip.

Still another object of the present invention is to provide the constant voltage drive type driver circuit of the type described above which further comprises detection circuit means coupled to the pulse transformer for detecting an output current of the pulse transformer and for outputting a detection signal when the output current is less than a predetermined value, and control circuit means for disabling the short-circuiting means in response to the detection signal received from the detection circuit means. According to the driver circuit of the present invention, it is possible to output from the pulse transformer optimum output pulses having virtually no undershoot depending on the impedance value of the load impedance.

Other objects and further features of the present invention will be apparent from the following detailed description when read in conjunction with the accompanying drawings.

DESCRIPTION OF THE PREFERRED EMBODIMENTS

Figure 6:
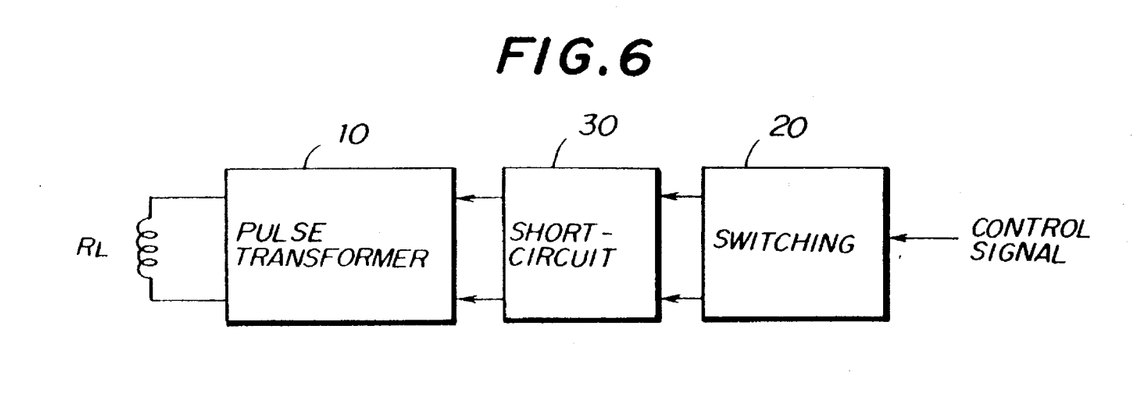
FIG. 6 is a system block diagram for explaining an operating principle of one aspect of a driver circuit according to the present invention.

First, a description will be given of an operating principle of one aspect of a driver circuit according to the present invention, by referring to FIG. 6. A pulse transformer 10, a short-circuiting means 30 and a switching circuit 20 are connected as shown in FIG. 6. A load impedance $R_L$ is connected to the secondary winding side of the pulse transformer 10 when the line side is viewed from the pulse transformer 10. The switching circuit 20 applies a reference voltage to a primary winding of the pulse transformer 10 with a desired polarity, or cuts off the application of the reference voltage in response to a control signal. Hence, pulses having a regular peak value are output to the load impedance $R_L$ from the secondary winding of the pulse transformer 10. The short-circuiting means 30 short-circuits the primary winding of the pulse transformer 10 during a predetermined time from a time when the application of the reference voltage is cut off by the switching circuit 20.

Figure 7:
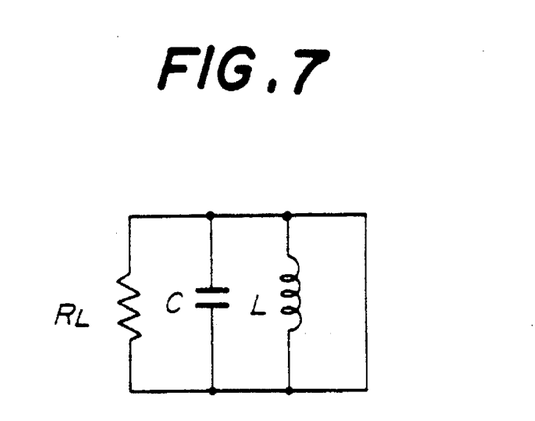
FIG. 7 is a circuit diagram of a circuit corresponding to the driver circuit shown in FIG. 6 when the terminals on the secondary winding side of the pulse transformer 10 are short-circuited.

According to this aspect of the present invention, the terminals on the primary winding side of the pulse transformer 10 assume a high impedance state when no reference voltage is supplied to the pulse transformer 10. But in this case, the short-circuiting means 30 short-circuits the primary winding of the pulse transformer 10 during the predetermined time from the time when the application of the reference voltage is cut off by the switching circuit 20. Accordingly, when the terminals on the primary winding side of the pulse transformer 10 are short-circuited, the equivalent circuit becomes as shown in FIG. 7 when viewed on the side of the load impedance $R_L$. In FIG. 7, the inductance L of the pulse transformer 10, the line capacitance C and an impedance $R_L$ of the load impedance $R_L$ are short-circuited.

For this reason, the charge stored in the line capacitance C is instantaneously discharged via the short-circuiting means 30 immediately after the application of the reference voltage to the pulse transformer 10 is cut off by the switching circuit 20, and the above described equivalent circuit will not function as a damped oscillation circuit.

When the impedance $R_L$ of the load impedance $R_L$ is greater than a predetermined value, no damped oscillation current flows in the parallel circuit which includes the inductance L, the line capacitance C and the load impedance $R_L$, and no undershoot occurs at the falling edge of the output pulses because a transient current of the overdamping or critical damping flows. In other words, the waveform of the falling edge of the output pulses converges to a predetermined value with a certain time constant. For this reason, when the equivalent circuit shown in FIG. 7 is formed by operating the short-circuiting means 30 immediately after the application of the reference voltage to the pulse transformer 10 is cut off, the transient current oscillates.

Figure 8:
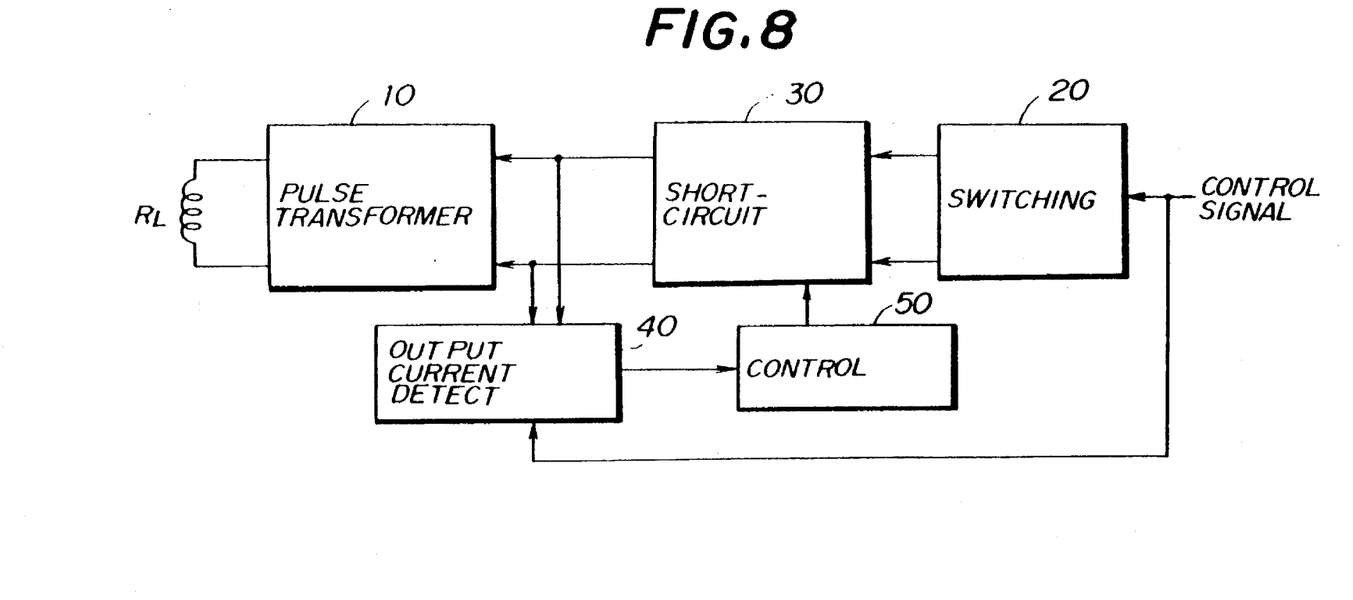
FIG. 8 is a system block diagram for explaining an operating principle of another aspect of the driver circuit according of the present invention.

Hence, according to another aspect of the driver circuit of the present invention, an output current detecting circuit 40 and a control circuit 50 are additionally provided as shown in FIG. 8. In FIG. 8, those parts which are the same as those corresponding parts in FIG. 6 are designated by the same reference numerals, and a description thereof will be omitted.

The output current detecting circuit 40 detects an output current of the pulse transformer 10. In addition, the control circuit 50 controls the short-circuiting means 30 to an inoperative state when the output current detected by the output current detecting circuit 40 is less than a predetermined value.

According to this other aspect of the present invention, it is detected that the impedance $R_L$ of the load impedance $R_L$ of the pulse transformer 10 is greater than a first predetermined value when the output current detecting circuit 40 detects that the output current of the pulse transformer 10 is less than a second predetermined value. Hence, the control circuit 50 controls the short-circuiting means 30 to the inoperative state when the output current detected by the output current detecting circuit 40 is less than the second predetermined value.

Figure 9:
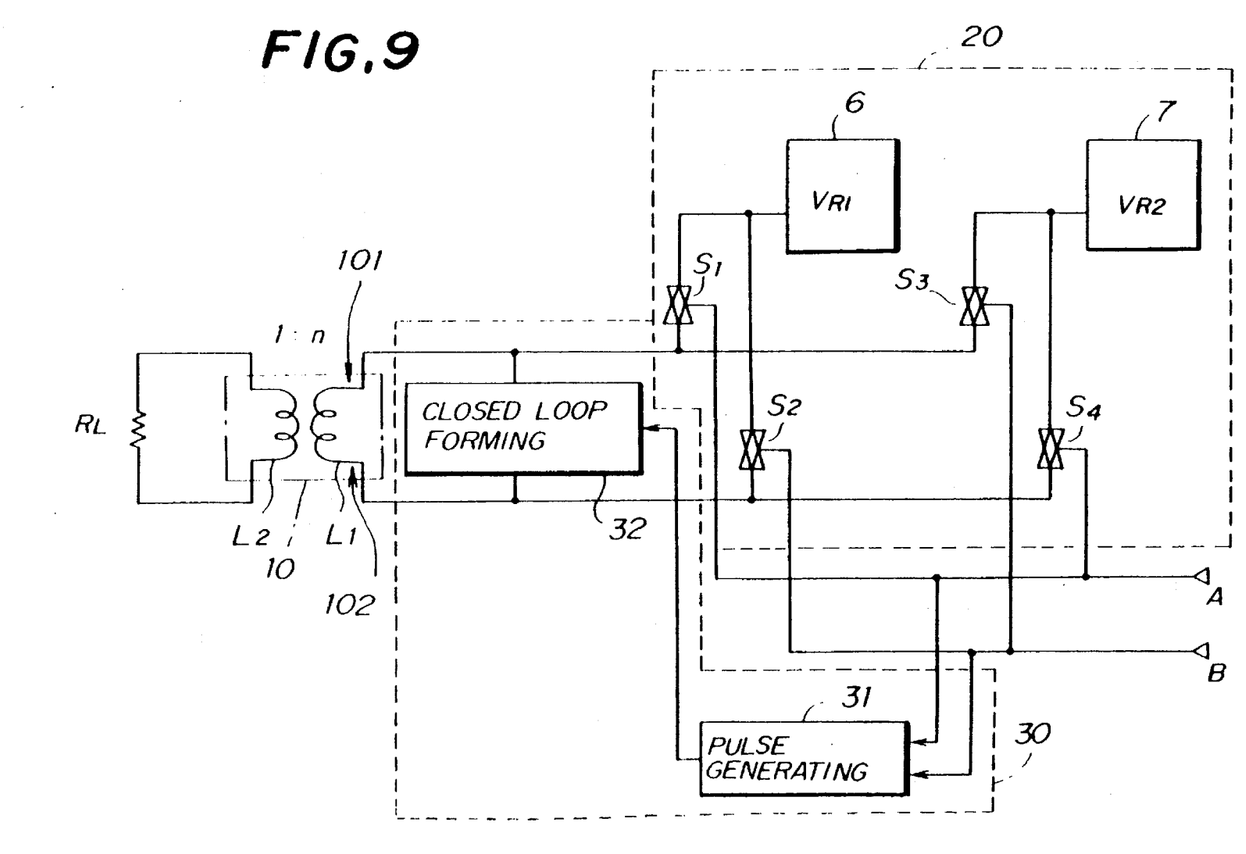
FIG. 9 is a circuit diagram of a first driver circuit according to the present invention.

Next, a description will be given of a first embodiment of the driver circuit according to the present invention, by referring to FIG. 9. In FIG. 9, those parts which are essentially the same as those corresponding parts in FIGS. 2 and 6 are designated by the same reference numerals, and a description thereof will be omitted.

In FIG. 9, the short-circuiting means 30 is made up of a pulse generating circuit 31 and a closed loop forming circuit 32.

Figure 10:
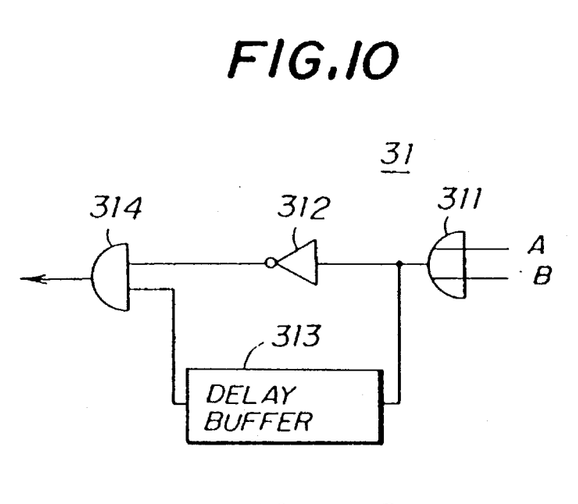
FIG. 10 is a circuit diagram of the pulse generating circuit 31 shown in FIG. 9.

The pulse generating circuit 31 receives the first and second control signals A and B and supplies an output signal to the closed loop forming circuit 32. FIG. 10 shows an embodiment of the pulse generating circuit 31. The pulse generating circuit 31 includes a 2-input OR circuit 311, an inverter 312, a delay buffer 313 and a 2-input AND circuit 314 which are connected as shown in FIG. 10.

Figure 11A:
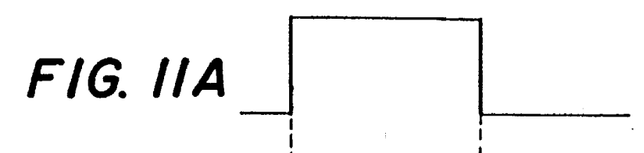
FIG. 11 is a timing chart for explaining the operation of the pulse generating circuit 31 shown in FIG. 10.
Figure 11B:
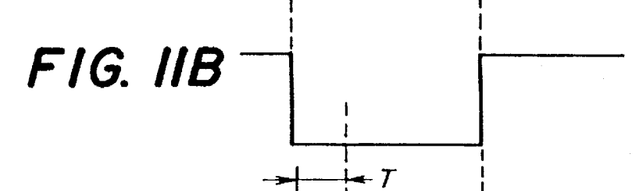
Figure 11C:
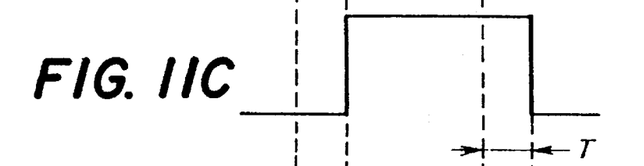
Figure 11D:
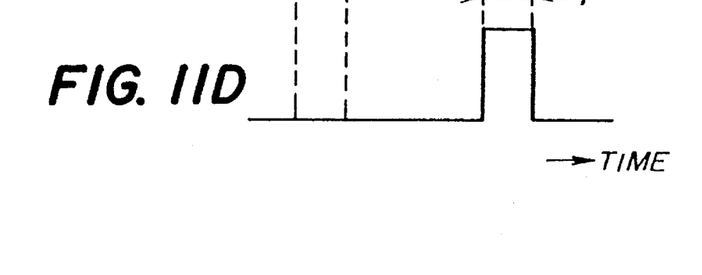

In FIG. 10, the first and second control signals A and B are supplied to the OR circuit 311, and an output signal of the OR circuit 311 is supplied to the inverter 312 on one hand and to the delay buffer 313 on the other. When the output signal of the OR circuit 311 has a waveform shown in FIG. 11(A), for example, a phase inverted signal shown in FIG. 11(B) is output from the inverter 312. On the other hand, a signal which is delayed by a predetermined time T as shown in FIG. 11(C) is output from the delay buffer 313. The AND circuit 314 obtains a logical product of the output signals of the inverter 312 and the delay buffer 313, and outputs a signal shown in FIG. 11(D). As shown in FIG. 11(D), the output signal of the AND circuit 314 has a high level for the predetermined time T from a time when both the first and second control signals A and B assume a low level.

The predetermined time T is set smaller than the upward and downward pulse widths of the output pulses of the pulse transformer 10.

Figure 12:
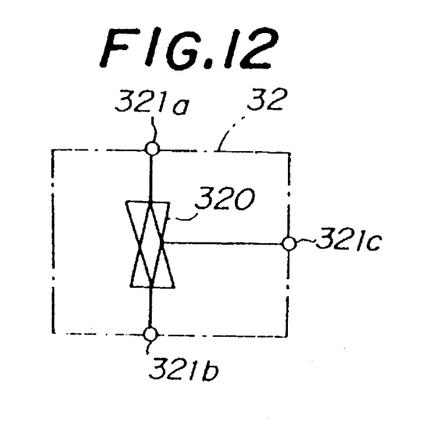
FIG. 12 is a circuit diagram of the closed loop forming circuit 32 shown in FIG. 9.

Next, a description will be given of the construction and operation of the closed loop forming circuit 32. FIG. 12 shows an embodiment of the closed loop forming circuit 32. The closed loop forming circuit 32 shown in FIG. 12 is made up of an analog switch 320.

The analog switch 320 has a first terminal 321a which is connected to one end 101 of the primary winding L1 of the pulse transformer 10, and a second terminal 321b which is connected to another end 102 of the primary winding of the pulse transformer 10. The analog switch 320 further has a control terminal 321c which is connected to the output terminal of the pulse generating circuit 31, that is, the output terminal of the AND circuit 314 shown in FIG. 10.

The analog switch 320 turns ON when a high-level signal is applied to the control terminal 321c and turns OFF when a low-level signal is applied to the control terminal 321c.

Figure 13A:
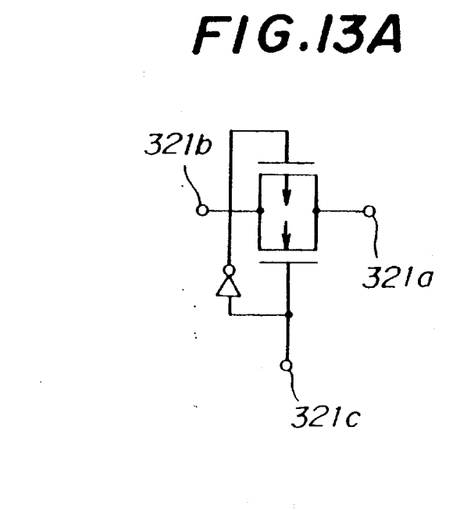
FIGS. 13A, 13B and 13C show 3 different circuits forming the analog switch 320 shown in FIG. 12.
Figure 13B:
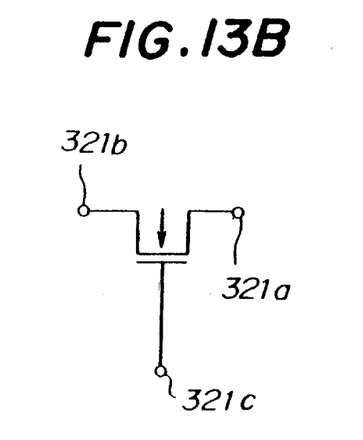
Figure 13C:
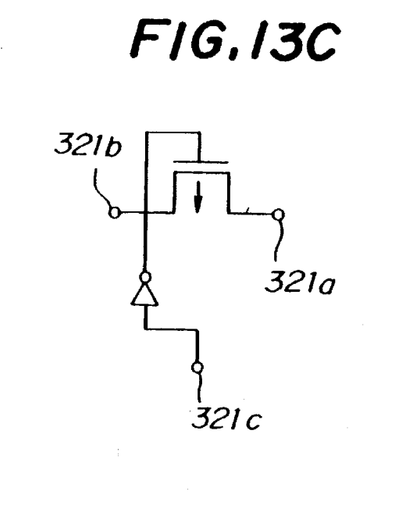

For example, the analog switch 320 is made up of a field effect transistor (FET). FIGS. 13A, 13B and 13C show embodiments of the analog switch 320. In FIG. 13A, the analog switch 320 is made up of two FETs and an inverter. In FIG. 13B, the analog switch 320 is made up of a single FET. In FIG. 13C, the analog switch 320 is made up of a FET and an inverter.

Figure 14A:
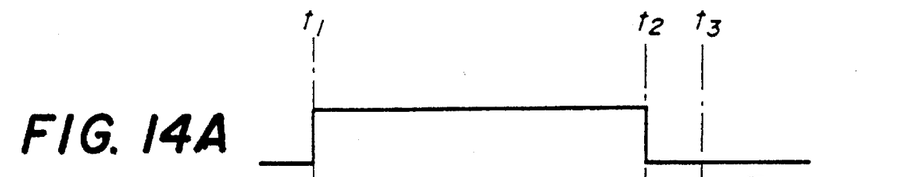
FIG. 14 is a timing chart for explaining the operation of the circuit of FIG. 5.
Figure 14B:
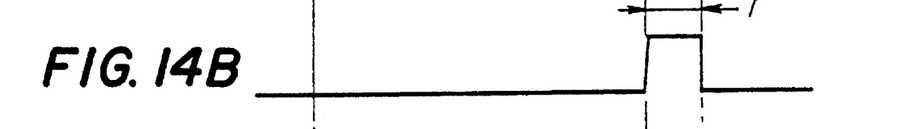

In the driver circuit shown in FIG. 9 which includes the pulse generating circuit 31 and the closed loop forming circuit 32 having the above described constructions, an output control signal which is a logical sum of the first and second control signals A and B has a high level as shown in FIG. 14(A) when one of the first and second control signals A and B has a high level. However, during a time interval between times t1 and t2 when the output control signal has the high level, the output signal of the pulse generating circuit 31 has a low level as shown in FIG. 14(B). Accordingly, the analog switch 320 which forms the closed loop forming circuit 32 is OFF during this time interval between the times t1 and t2.

Figure 14C:
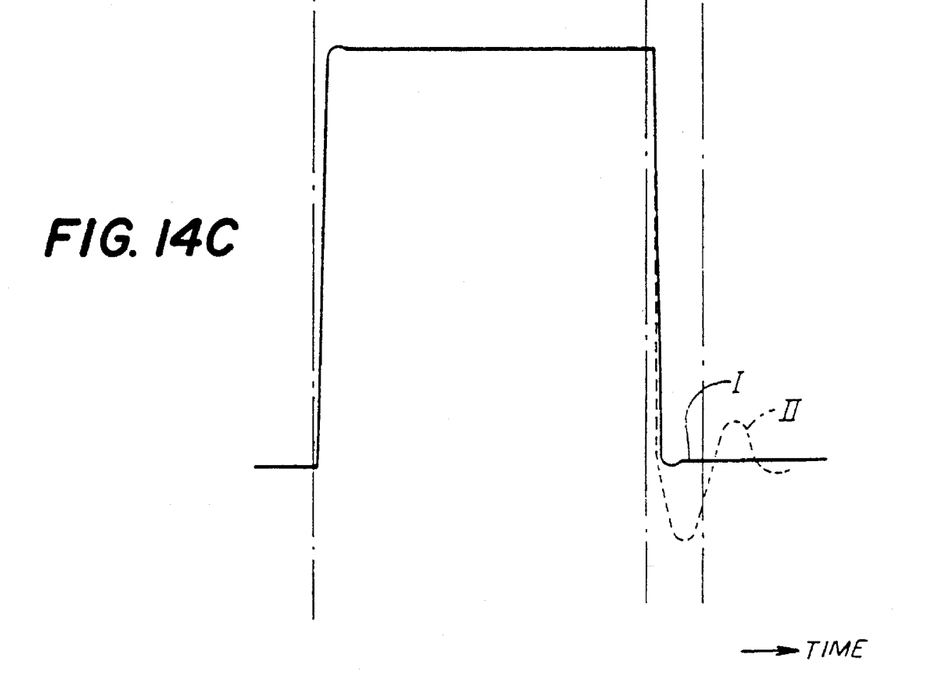

During the time interval in which one of the first and second control signals A and B has the high level, a voltage difference $(V_{R1}-V_{R2})$ between the first reference voltage $V_{R1}$ and the second reference voltage $V_{R2}$ is applied to the primary winding L1 of the pulse transformer 10 as a reference voltage which has a desired one of positive and negative polarities. Hence, similarly to the conventional driver circuit, the upward pulse or downward pulse is output to the load impedance $R_L$ from the pulse transformer 10. For example, when the first control signal A has the high level during the time interval between the times t1 and t2, the upward pulse having the waveform shown in FIG. 14(C) is output to the load impedance $R_L$ from the pulse transformer 10.

Next, when the first control signal A undergoes a transition from the high level to the low level at the time t2 and the second control signal B remains at the low level, the output control signal (logical sum of the first and second control signals A and B) undergoes a transition to the low level at the time t2 as shown in FIG. 14(A). Accordingly, as described above in conjunction with FIGS. 10 and 11, the pulse generating circuit 31 supplies to the closed loop forming circuit 32 a signal shown in FIG. 14(B) which has a high level during a time interval between times t2 and t3, that is, for the predetermined time T from the time t2.

Therefore, the analog switch 320 which forms the closed loop forming circuit 32 is ON during the time interval between the times t2 and t3, and short-circuits the terminals 101 and 102 of the primary winding L1 of the pulse transformer 10 during this time interval. As a result, the transient current in the circuit which includes the load impedance $R_L$ and the pulse transformer 10 will not undergo damped oscillation for the reasons described above. Hence, the output pulses output to the load impedance $R_L$ from the pulse transformer 10 falls as indicated by a solid line I in FIG. 14(C), and it is possible to suppress the generation of an undershoot which occurs in the conventional driver circuit as indicated by a phantom line II in FIG. 14(C). Accordingly, the pulse mask prescribed under Section 8.5.3 of the CCITT Recommendations of the Series I.430 can be sufficiently satisfied at the S and T reference points of the ISDN.

Figure 15:
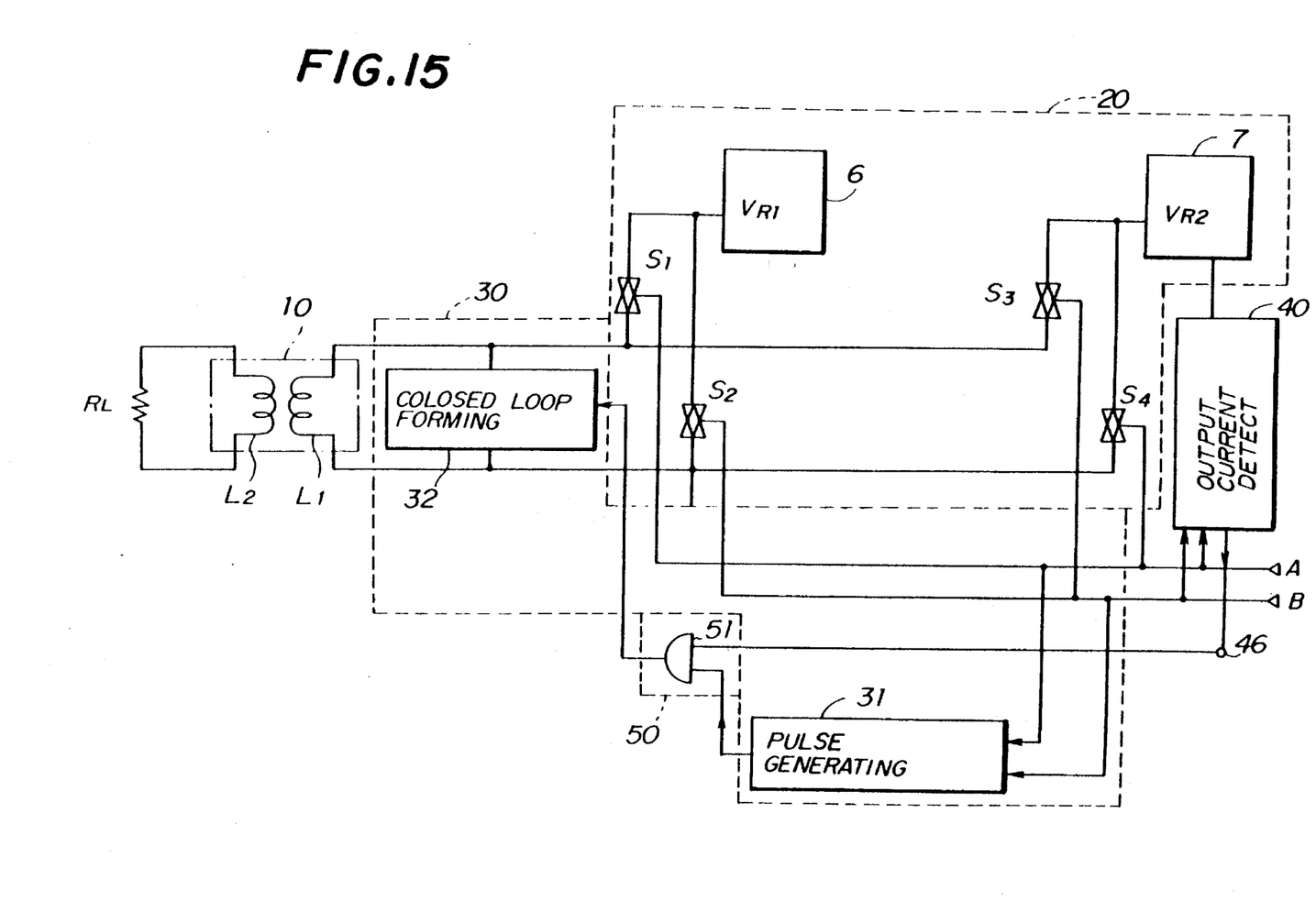
FIG. 15 is a circuit diagram of a second driver circuit according to the present invention.

Next, a description will be given of a second embodiment of the driver circuit according to the present invention, by referring to FIG. 15. In FIG. 15, those parts which are the same as those corresponding parts in FIGS. 8 and 9 are designated by the same reference numerals, and a description thereof will be omitted.

In FIG. 15, the output current detecting circuit 40 is connected to the primary winding L1 of the pulse transformer 10 and detects the current which flows through the primary winding L1. The output current detecting circuit 40 outputs a low-level signal when the detected current is less than or equal to a predetermined value and outputs a high-level signal when the detected current is greater than the predetermined value.

A 2-input AND circuit 51 forms the control circuit 50. The AND circuit 51 obtains a logical product of the output signal of the output current detecting circuit 40 and the output signal of the pulse generating circuit 31. An output signal of the AND circuit 51 is supplied to the closed loop forming circuit 32 as a control signal.

In the constant voltage drive type driver circuit which is used for the interface at the S and T reference points of the ISDN, the load impedance $R_L$ is prescribed as either 50 ohms or 400 ohms. When the load impedance $R_L$ is 50 ohms, the undershoot of the output pulses can be suppressed by the first embodiment. However, when the load impedance $R_L$ is 400 ohms, the falling edge of the output pulses becomes distorted when the primary winding side of the pulse transformer 10 is short-circuited at the falling edge of the output pulses.

For this reason, the second embodiment takes note of the fact that the current which flows through the primary winding L1 of the pulse transformer 10 decreases as the impedance $R_L$ of the load impedance $R_L$ increases. The output current detecting circuit 40 detects whether or not the load impedance $R_L$ is 50 ohms or 400 ohms based on the output current. The output current detecting circuit 40 output a high-level detection signal when the load impedance $R_L$ is 50 ohms, and outputs a low-level detection signal when the load impedance $R_L$ is 400 ohms.

Figure 16:
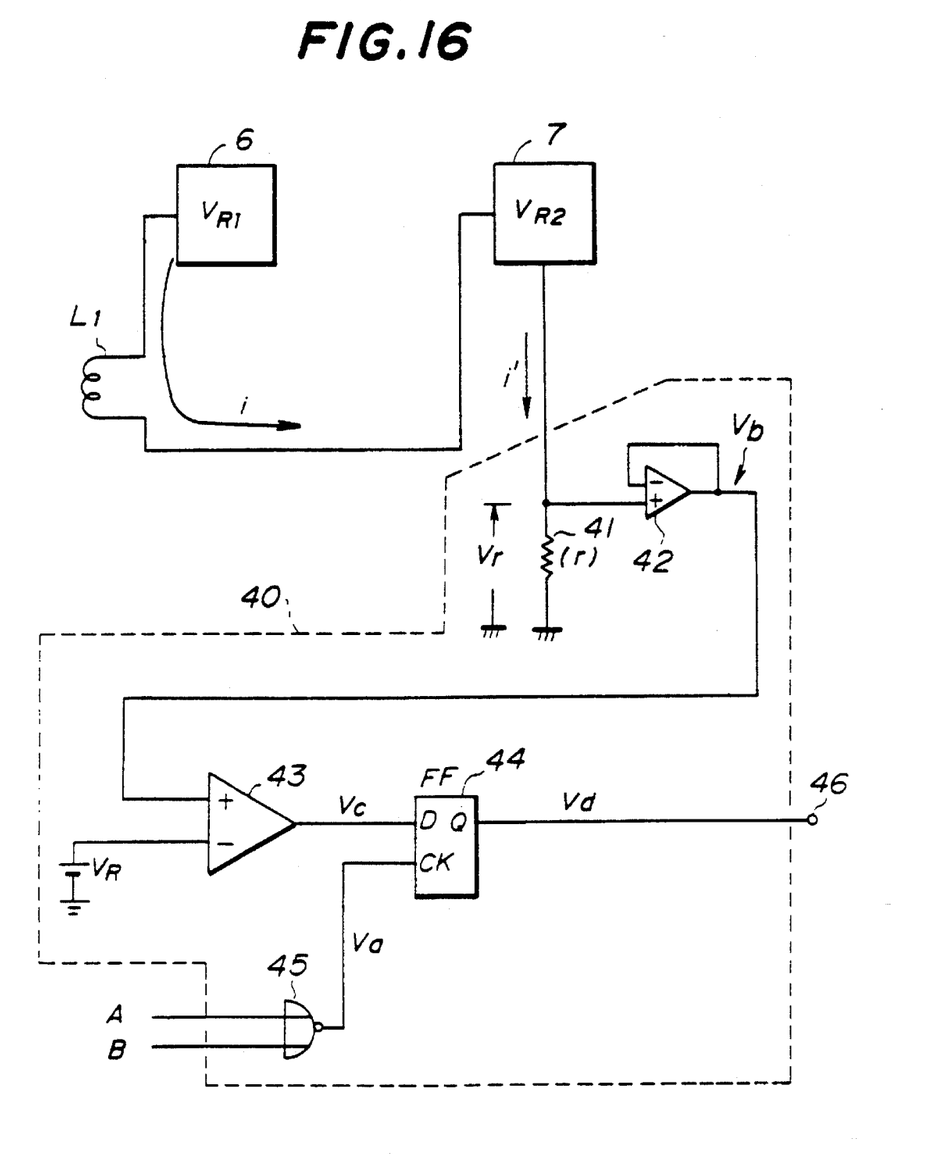
FIG. 16 is a circuit diagram of an embodiment of an output current detecting circuit shown in FIG. 15.

FIG. 16 shows an embodiment of the output current detecting circuit 40 shown in FIG. 15. When the analog switches S1 and S4 (or S2 and S3) turn ON, the output current i which flows through the primary winding L1 of the pulse transformer 10 passes through the reference voltage source 7 and is supplied to a resistor 41 as a current i'. The resistor 41 has a resistance r. Hence, a voltage $Vr=i'\times r$ is applied across the resistor 41. This voltage Vr is dependent on the output current i and has a high level during a time in which the output current i flows. Accordingly, a voltage Vb shown in FIG. 17(B) which is obtained by subjecting the voltage Vr to an impedance conversion in a voltage follower 42 has the same waveform as the voltage Vr. The voltage Vb is supplied to a comparator 43 in a next stage and is compared with a reference voltage $V_R$.

Figure 17A:
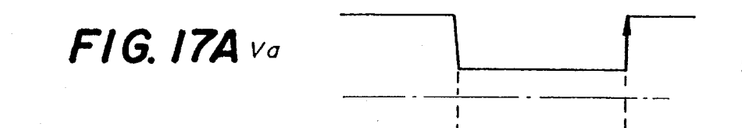
FIGS. 17 and 18 are timing charts for explaining an operation of the output current detecting circuit shown in FIG. 16.
Figure 17B:
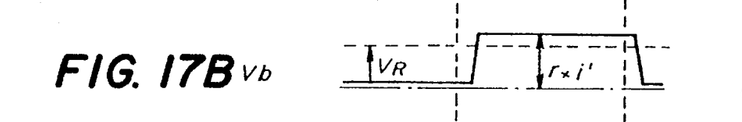

When the load impedance $R_L$ is 50 ohms, the voltage Vb is greater than the reference voltage $V_R$ which is indicated by a phantom line in FIG. 17(B), because the output current i is large compared to the case where the load impedance $R_L$ is 400 ohms. For this reason, the comparator 43 outputs a high level signal Vc shown in FIG. 17(C), and this high-level signal Vc is supplied to a data input terminal D of a D-type flip-flop 44.

Figures 17C, 17D:
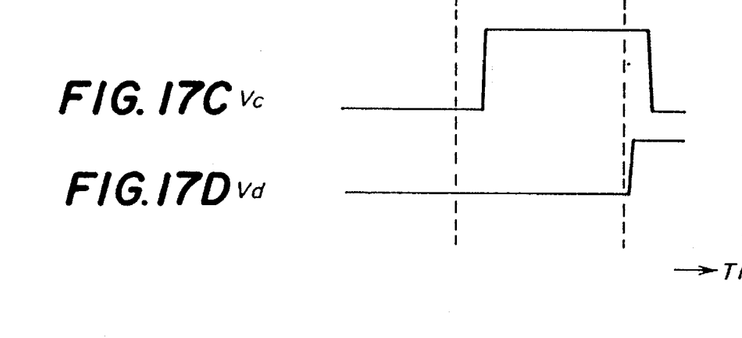

On the other hand, a 2-input NOR circuit 45 receives the first and second control signals A and B and outputs a signal Va shown in FIG. 17(A). The signal Va has a low level when one of the first and second control signals A and B has a high level. The signal Va is supplied to a clock input terminal CK of the flip-flop 44. Hence, a signal Vd shown in FIG. 17(D) is output from the flip-flop 44 and supplied to an output terminal 46. This signal Vd has a high level when both the first and second control signals A and B have the low level and the output signal Vc of the comparator 43 is latched at a time when the output signal Va of the NOR circuit 45 rises.

Figure 18A:
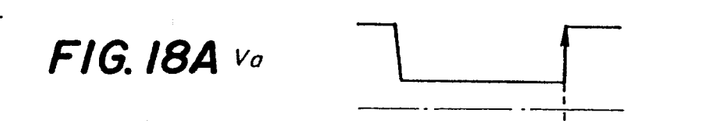
Figure 18B:
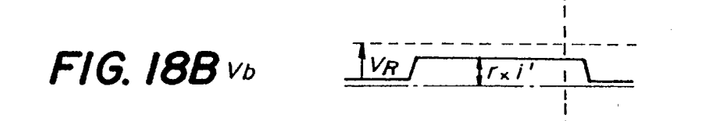
Figure 18C:
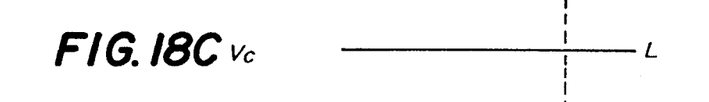
Figure 18D:
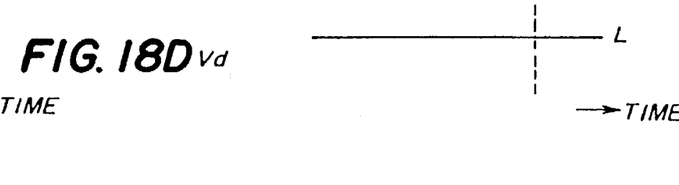

When the load impedance $R_L$ is 400 ohms, the voltage Vb is smaller than the reference voltage $V_R$ as shown in FIG. 18(B). Hence, the output signal Vc of the comparator 43 remains at the low level as shown in FIG. 18(C), and the output signal Vd of the flip-flop 44 remains at the low level as shown in FIG. 18(D). FIG. 18(A) shows the output signal Va of the NOR circuit 45.

Accordingly, when the load impedance $R_L$ is 50 ohms, the AND circuit 51 shown in FIG. 15 is open and supplies the output pulses of the pulse generating circuit 31 to the closed loop forming circuit 32, similarly as in the case of the first embodiment.

But when the load impedance $R_L$ is 400 ohms, the output detection signal of the output current detecting circuit 40 has the low level and the AND circuit 51 is closed. For this reason, the output pulses of the pulse generating circuit 31 are blocked by the AND circuit 51 and will not be supplied to the closed loop forming circuit 32. For this reason, according to the second embodiment, the closed loop forming circuit 32 is made inoperative when the load impedance $R_L$ is 400 ohms, and the rest of the operation of the driver circuit is essentially the same as that of the conventional driver circuit. In this case, the output pulses output from the pulse transformer 10 to the load impedance $R_L$ have falling edges which converge to the zero level with a certain time constant. Therefore, the pulse mask prescribed under Section 8.5.3 of the CCITT Recommendations of the Series I.430 can be sufficiently satisfied at the S and T reference points of the ISDN.

Figure 19:
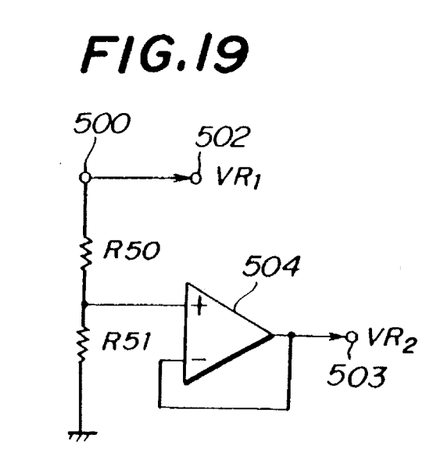
FIG. 19 is a circuit diagram of an embodiment of a reference voltage source used in the first and second embodiments.

FIG. 19 shows an embodiment of a reference voltage source. This reference voltage source functions as the reference voltage sources 6 and 7 used in the first and second embodiments. A terminal 500 is connected to a positive power source. Resistors R50 and R51 are connected in series between the terminal 500 and ground, and a non-inverting input terminal of a differential amplifier 504 is connected to a node between the resistors R50 and R51. An output terminal of the differential amplifier 504 is connected to an inverting input terminal of the differential amplifier 504. The reference voltage VR1 is obtained from a terminal 502, and the reference voltage VR2 is obtained from a terminal 503.

In the described embodiments, the present invention is applied to the interface of the S and T reference points of the ISDN. However, it is of course possible to apply the constant voltage drive type driver circuit according to the present invention to other purposes.

Further, the present invention is not limited to these embodiments, but various variations and modifications may be made without departing from the scope of the present invention.

What is claimed is:

1. A constant voltage drive type driver circuit coupled to receive control signals and coupled to an equivalent load impedance, comprising:

a pulse transformer for outputting output pulses having a predetermined peak value, said pulse transformer having primary and secondary windings, said primary winding having first and second terminals, the equivalent load impedance being connected to the secondary winding when viewed from said pulse transformer, excluding an impedance of the secondary winding itself;

power source means for supplying a voltage;

switching circuit means, coupled to said power source means, for supplying the voltage from said power source means to the primary winding of said pulse transformer in a first mode and for cutting off the supply of the voltage to the primary winding in a second mode in response to the control signals; and short-circuiting means, coupled between said switching circuit means and the primary winding of said pulse transformer, for short-circuiting the first and second terminals of the primary winding of said pulse transformer for a predetermined time from a time when said switching circuit means assumes the second mode.

2. The constant voltage drive type driver circuit as claimed in claim 1, wherein said power source means includes:

a first power source for supplying a first power source voltage; and a second power source for supplying a second power source voltage which is smaller than the first power source voltage, wherein the control signals include first and second control signals, and wherein said switching circuit means includes:

a first switching circuit, coupled to the first terminal and the first and second power sources, for supplying the first power source voltage to the first terminal in response to the first control signal and for supplying the second power source voltage to the first terminal in response to the second control signal; and a second switching circuit, coupled to the second terminal and the first and second power sources, for supplying the second power source voltage to the second terminal in response to the first control signal and for supplying the second power source voltage to the second terminal in response to the second control signal.

3. The constant voltage drive type driver circuit as claimed in claim 1, wherein said short-circuiting means includes:

a pulse generating circuit for generating a pulse signal based on the control signals, said pulse signal having a predetermined logic level for the predetermined time from the time when said switching circuit means assumes the second mode; and a closed loop forming circuit, .coupled to the first and second terminals of the primary winding of said pulse transformer, for short-circuiting the first and second terminals of the primary winding of said pulse transformer during the predetermined logic level of the pulse signal received from said pulse generating circuit.

4. The constant voltage drive type driver circuit as claimed in claim 1, wherein said pulse transformer is used in an interface at a reference point.

5. The constant voltage drive type driver circuit as claimed in claim 1, further comprising:

detection circuit means coupled to said pulse transformer, for detecting an output current of said pulse transformer and for outputting a detection signal when the output current is less than a predetermined value; and control circuit means for disabling said short-circuiting means in response to the detection signal received from said detection circuit means.

6. The constant voltage drive type driver circuit as claimed in claim 5, wherein said power source means includes:

a first power source for supplying a first power source voltage; and a second power source for supplying a second power source voltage which is smaller than the first power source voltage, wherein the control signals include first and second control signals, and wherein said switching circuit means includes:

a first switching circuit coupled to the first terminal and the first and second power sources, for supplying the first power source voltage to the first terminal in response to the first control signal and for supplying the second power source voltage to the first terminal in response to the second control signal; and a second switching circuit coupled to the second terminal and the first and second power sources for supplying the second power source voltage to the second terminal in response to the first control signal and for supplying the second power source voltage to the second terminal in response to the second control signal.

7. The constant voltage drive type driver circuit as claimed in claim 5, wherein said short-circuiting means includes:

a pulse generating circuit for generating a pulse signal based on the control signals, said pulse signal having a predetermined logic level for the predetermined time from the time when said switching circuit means assumes the second mode; and a closed loop forming circuit, coupled to the first and second terminals of the primary winding of said pulse transformer, for short-circuiting the first and second terminals of the primary winding of said pulse transformer during the predetermined logic level of the pulse signal received from said pulse generating circuit.

8. The constant voltage drive type driver circuit as claimed in claim 7, wherein said control circuit means includes a gate coupled to said pulse generating circuit and said detection circuit, for cutting off the supply of the pulse signal from said pulse generating circuit to said closed loop forming circuit in response to the detection signal received from said detection circuit means.

9. The constant voltage drive type driver circuit as claimed in claim 5, wherein said predetermined value is set depending on an impedance value of said load impedance.

10. The constant voltage drive type drive circuit as claimed in claim 5, wherein said pulse transformer is used in an interface at a reference point.

11. A constant voltage type driver circuit coupled to receive control signals, comprising:

a transformer having primary and secondary windings, the primary winding having first and second terminals;

means for supplying a voltage to the primary winding of said pulse transformer in a first mode and for cutting off the supply of the voltage to the primary winding in a second mode in response to the control signals; and means for short-circuiting the first and second terminals of the primary winding of said transformer for a predetermined time from a time when the second mode begins.

12. The constant voltage type driver circuit of claim 11, wherein said short-circuiting means includes:

a pulse generating circuit for generating a pulse signal based on the control signals, said pulse signal having a predetermined logic level for the predetermined time from the time when said voltage supplying means begins the second mode; and a closed loop forming circuit, coupled to the first and second terminals of the secondary winding of said transformer, for short-circuiting the first and second terminals of the secondary winding of said transformer while the predetermined logic level of the pulse signal is received from said pulse generating circuit.

13. The constant voltage type driver circuit of claim 12, further comprising:

a detection circuit coupled to said transformer, for detecting an output current of said transformer and for outputting a detection signal when the output current is less than a predetermined value; and means for disabling said short-circuiting means in response to the detection signal received from said detection circuit.

14. The constant voltage type driver circuit of claim 11, further comprising:

a detection circuit coupled to said transformer, for detecting an output current of said transformer and for outputting a detection signal when the output current is less than a predetermined value; and means for disabling said short-circuiting means in response to the detection signal received from said detection circuit.

15. A method for driving a pulse transformer having primary and secondary windings, the primary winding having first and second terminals, comprising:

(a) supplying a voltage to the primary winding of the pulse transformer in a first mode;

(b) cutting off the supply of the voltage to the primary winding in a second mode; and (c) short-circuiting the first and second terminals of the primary winding of the pulse transformer for a predetermined time from a time when the second mode begins.

16. The method of claim 15, wherein said step (c) includes:

(c1) generating a pulse signal having a predetermined logic level for the predetermined time from the time when the second mode begins; and (c2) short-circuiting the first and second terminals of the primary winding of the pulse transformer while the pulse signal is at the predetermined logic level.

17. The method of claim 16, further comprising steps of:

(d) detecting an output current of the pulse transformer and outputting a detection signal when the output current is less than a predetermined value; and (e) disabling said short-circuiting step (c) in response to the detection signal.

18. The method of claim 15, further comprising steps of:

(d) detecting an output current of the pulse transformer and outputting a detection signal when the output current is less than a predetermined value; and (e) disabling said short-circuiting step (c) in response to the detection signal.

19. A constant voltage drive type driver circuit coupled to receive control signals and coupled to an equivalent load impedance, comprising:

a pulse transformer for outputting output pulses having a predetermined peak value, said pulse transformer having primary and secondary windings, said primary winding having first and second terminals, the equivalent load impedance being connected to the secondary winding when viewed from said pulse transformer, excluding an impedance of the secondary winding itself;

power source means for supplying a voltage;

switching circuit means, coupled to said power source means, for supplying the voltage from said power source means to the primary winding of said pulse transformer in a first mode and for cutting off the supply of the voltage to the primary winding in a second mode in response to the control signals; and short-circuiting means, coupled between said switching circuit means and the primary winding of said pulse transformer, for short-circuiting the first and second terminals of the primary winding of said pulse transformer for a predetermined time from a time when said switching circuit means assumes the second mode, the first and second terminals of the primary winding of said pulse transformer being released after the predetermined time has elapsed from the time when said switching circuit means assumes the second mode.

20. A method for driving a pulse transformer having primary and secondary windings, the primary winding having first and second terminals, comprising:

(a) supplying a voltage to the primary winding of the pulse transformer in a first mode;

(b) cutting off the supply of the voltage to the primary winding in a second mode; and (c) suppressing undershoot of output pulses of the pulse transformer by short-circuiting the first and second terminals of the primary winding of the pulse transformer for a predetermined time from the time when the second mode begins.

* * * * *

UNITED STATES PATENT AND TRADEMARK OFFICE
CERTIFICATE OF CORRECTION

PATENT NO. : 5,517,066

DATED : May 14, 1996

INVENTOR(S) : Hideki SHUTOU, et al.

It is certified that error appears in the above-indentified patent and that said Letters Patent is hereby corrected as shown below:

TITLE PAGE [57] ABSTRACT, line 3, "primary" (second occurrence) should be --secondary--;
line 4, "secondary" should be --primary--.

Col. 1, line 38, "NT1 1a" should be --NT1 1--.

Col. 2, line 15, "VR1" should be --$V_{R1}$--;
line 19, "L2" should be --L1--.

Col. 4, line 18, "convent al" should be --conventional--.

Col. 8, line 23, "output" should be --outputs--.

Signed and Sealed this

Twentieth Day of August, 1996

Attest:

BRUCE LEHMAN

*Attesting Officer*  *Commissioner of Patents and Trademarks*